March 7, 1967 M. S. SHEPARD 3,308,007
TREATMENT FOR IMPROVING ADHESION OF FIBROUS
MATERIAL TO RUBBER
Filed May 6, 1963

INVENTOR
MARVIN S. SHEPARD

BY Frank C. Hilberg
ATTORNEY

United States Patent Office 3,308,007
Patented Mar. 7, 1967

3,308,007
TREATMENT FOR IMPROVING ADHESION OF
FIBROUS MATERIAL TO RUBBER
Marvin S. Shepard, Wilmington, Del., assignor to E. I.
du Pont de Nemours and Company, Wilmington, Del.,
a corporation of Delaware
Filed May 6, 1963, Ser. No. 282,830
12 Claims. (Cl. 161—170)

This application is a continuation-in-part of my application Serial No. 10,478 filed February 23, 1960, and now abandoned. The invention relates to the treatment of fibrous material and more particularly to a method for treating fibrous textile materials to improve their adhesion to rubber. Specifically, the invention provides a new process for treating fibrous textile materials, and preferably synetheic fibrous materials such as, for example, rayon, nylon, and polyester fibers to improve their ability to adhere to rubber under severe flexing conditions.

Many rubber articles such as vehicle tires, conveyor belts, power transmission belts, diaphragms, and the like are reinforced with textile materials which serve to increase the tensile strength of the article and restrict the degree of distortion under service conditions. These fibrous materials are generally placed within the mass of elastomer compound and must be firmly bonded to said compound to provide a unitary structure. Under the conditions of loading and flexing in service, high shear stresses occur at the interface betwen the fibrous materials and the elastomer compound and if the bond strength is not sufficiently high, separation will occur at the interface. It is therefore necessary that a high bond strength be maintained throughout the expected service life of the article.

Cotton textiles bond to elastomer compositions sufficiently well without special treatments to give articles of useful service life. Synthetic fibers, and particularly those in the continuous filament form bond very poorly to rubber and must be given special adhesion treatments if satisfactory adhesion is to be obtained. Adhesive compositions which are satisfactory for many such uses when applied to rayon and nylon are now well known. The most satisfactory are natural and synthetic rubber latices containing resorcinol-aldehyde resins. Other systems having some success are based upon polyisocyanates or their adducts usually dispersed in a solvent solution of elastomer compounds. Such adhesives are lacking in many desired characteristics. The dispersions and solutions are not stable and tend to gel on standing relatively short times. The use of inflammable solvents creates both an expense and a fire hazard. The composition of the adhesives must be varied to give bonds to various types of rubber compositions and the treated textiles tend to lose their ability to adhere to rubber on standing.

The polyester fibers such as polyethylene terephthalate fibers have physical characteristics such as high strength, high stretching modulus, low creep, and good resistance to flexing which makes them very desirable materials for the reinforcement of rubber articles. However, the adhesive systems commercially satisfactory for rayon and nylon do not provide sufficiently good adhesion when applied to the polyester fibers and this fact has severely limited the use of such fibers as reinforcement in rubber articles. So far as is known, the adhesive system for polyester fibers most nearly meeting commercial requirements is that disclosed in Belgian Patent 561,699. Many attempts have been made to utilize this system in a variety of rubber articles, but it has been found to be not generally applicable and its use is confined to relatively few classes of products.

It is an object of this invention to provide an adhesive system which gives a superior adhesive bond between elastomer compositions and synthetic, organic fibrous structures. A further objective is to provide an adhesive system providing superior adhesion between elastomer composition and synthetic, organic fibrous structures. A further objective is to provide an adhesive system providing superior adhesion between elastomer compositions and polyester fibers. A further objective is to provide such a system which is applicable with a variety of fibers and elastomer compositions. A still further objective is to provide such a system in which the components are stable both before and after application to the fibrous material, which does not require the use of inflammable solvents, and which can be applied with generally available equipment. Another objective is to provide as an intermediate product a fibrous structure treated with at least one component of the adhesive system which is stable and may be held for long periods with no substantial loss in adhesive potential. Other objectives will appear hereinafter.

These objectives are achieved by applying to the fibrous structure a first layer comprising a low molecular weight epoxy compound, applying over said first layer a second layer comprising a curing agent for said epoxy compound and a latex containing one or more elastomers, drying the so-treated fibrous structure and heating same to an elevated temperature to cause a curing reaction between the epoxy compound and the curing agent at least at the interface between said first and second layers, bringing the resulting structure into contact with a vulcanizable elastomer composition and curing the assembly with heat and pressure.

For purposes of describing this invention, the term "epoxy compound" is used to describe uncured chemical compounds having an average of more than one epoxy group in each molecule, a melting point below 150° C., an average molecular weight below 3,000 and an epoxide equivalent below 2,500. The preferred epoxy compounds are those having a melting point below 100° C., an average molecular weight below 1,500 and an epoxide equivalent below 850. Such compounds are commonly prepared by the reaction of halohydrins with polyhydric alcohols or with polyhydric phenols; as, for example, the reaction of epichlorohydrin with glycerol or with bisphenol. Many dervatives of the polyhydric alcohols and polyhyrdic phenols are useful. Such compounds are described in "Epoxy Resins" by Lee and Neville, McGraw-Hill Book Company, Inc., New York, 1957, pages 1–21. The term "epoxide equivalent" is the weight of resin in grams which contains 1 gram chemical equivalent of epoxy groups. The value is determined by the method described in Lee and Neville, page 21.

The term nylon is used to describe a linear fiber-forming condensation polymer characterized by recurring carbonamide groups as an integral part of the polymer chain.

The term "curing agent" or "epoxy curing agent" is used to describe those compounds which react with the epoxy compounds through the epoxy group to cause cross linking between the epoxy compound molecules to produce cured thermosetting and infusible resins. These curing agents may be polyfunctional compounds. The most commonly used are polyamines, for example, diethylene triamine and meta-phenylene diamine. Amine forming compounds such as tri(methyl arizidinyl) phosphine oxide are also useful. Other curing agents, for example, organic acids and acid anhydrides, may also serve to link the epoxy compound molecules, and suitable catalysts which are also considered curing agents, may be used to cause direct linkages through the epoxy groups or through substituent hydroxyl groups. The epoxy compounds, the curing agents, and the resins derived therefrom are well known and do not form a part of this invention.

The term "elastomer" is used to describe vulcanizable natural and synthetic rubbers including the butadiene polymers and copolymers with styrene, acrylonitrile, the vinyl pyridines and the like as well as polymers of chloroprene and isoprene and combinations of two or more of such materials. The term "elastomer compound" is used to describe compositions containing elastomers together with reinforcing agents, pigments vulcanizing materials, accelerators, antioxidants and the like are commonly used in the manufacture of reinforced rubber structures.

By "fibrous materials" is meant fibers, filaments, yarns, cords, woven, knitted, and braided fabrics, non-woven fabrics, felts, and batts. Low twist yarns are preferred because of cost and uniformity of application of the first layer. The term low twist is used to designate yarns having a twist of less than 6 turns per inch for 1100 denier yarns or equivalent twist for yarns of other denier.

First layer

The first adhesive layer which is applied directly to the fibrous material comprises an epoxy compound capable of polymerization or cross linking. Other ingredients which do not interfere therewith may be present if desired. If the epoxy compound chosen is a liquid at operating temperatures, it may be applied to the fibrous material directly by using a wiper roll, dipping, spraying, or the like. It is frequently more desirable to apply the epoxy compound from an aqueous solution or dispersion in which case a dispersing agent is commonly used. The term dispersion is used herein to include emulsions. In a preferred embodiment of the invention, a liquid having a low viscosity and low surface tension in the form of an aqueous solution or dispersion of the epoxy compound is mixed with a latex of an elastomer and the interstices and surface of the fibrous material is thoroughly wet with the mixture. In this case, the preferred elastomer is a copolymer comprising butadiene and vinyl pyridine, such as that know commercially as "Gen-Tac", sold by General Tire and Rubber Co.

The fibrous material treated with the first layer prepared and applied as described may be coated with the second layer without further treatment. It is frequently more desirable to handle a dried material at this stage and if so, the treated fibrous material may be dried to remove a part or substantially all of the water present. The fibrous material treated with the first layer may also be heated to elevated temperatures of 300° F. or above and this is often desired to stretch, shrink, or otherwise manipulate the fibrous material. Such drying and heating treatments do not substantially impair the adhesive potential of the first layer. In any event, the temperatures chosen and the time of heating should not cure the epoxy compound or vulcanize or char any adhesive constituent. The product at this stage is stable and may be stored, packaged, or sold as an article of commerce for subsequent use, preferably as described hereinafter.

Second layer

The second layer, which is applied over the said first layer comprises (a) a curing agent for the epoxy compound and (b) a latex which contains one or more synthetic elastomers. It is generally desirable to dissolve or disperse the curing agent in water and mix such solution or dispersion with the latex or latices. The composition prepared in this way is applied to the treated fibrous material (having already received the first layer) to form a second layer, after which the assembly is dried and heated to temperatures in excess of 300° F. During this heat treatment the curing agent and the epoxy compound react at least at the interface between the first and second layers and a composite coating is formed which is capable of bonding very firmly to elastomer compositions.

Bonding to elastomer composition

The fibrous material treated as described above is brought into contact with a vulcanizable elastomer compound and the assembly heated preferably under pressure to cause the uncured rubber composition to flow into intimate contact with the fibrous material and to vulcanize the elastomer composition.

It is found that the bond between fibrous material and rubber obtained by following the procedures of this invention as outlined above is extremely good. In fact, if attempts are made to separate the fibrous material from the cured elastomer compound, cleavage at the interface very seldom occurs. If sufficient force is applied, it usually causes a tearing of the cured elastomer stock and the fibrous material so separated is covered with a layer of the cured elastomer. Tests show that the adhesive bond is much better than that obtained if the expoxy compound, the curing agent and a latex are mixed into a single dispersion and applied to the fibrous material as recommended in British Patent 788,381; or if the epoxy compound together with its curing agent is applied to the fibrous material, dried, and then coated with a latex or latex containing a condensate of an aldehyde with a phenol, urea, melamine or ketone as disclosed by Schroeder in U.S. Patent No. 2,902,398, dated September 1, 1959. The improvement in the adhesive bond is particularly outstanding with polyester fibers, for example, polyethylene terephthalate, for which no adhesive system of the prior art has been satisfactory.

In the drawing, FIGURE 1 shows a cross section of a cord made up of low twist yarn 4. This is diagrammatic since 4 may be a fibrous material in the form of staple, filaments, yarn, or a fabric of any kind whether woven, knitted, felted, braided or batt.

Figure 1:
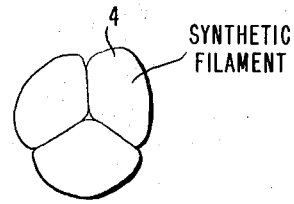
Figure 2:
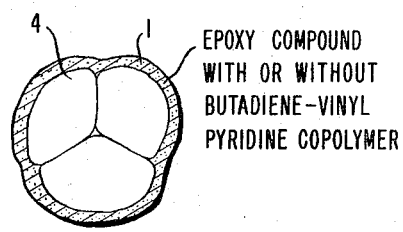
FIGURE 2 is a diagrammatic section of the fibrous material 4 having a coating 1 of a low molecular weight epoxy compound with or without an elastomer such as a butadiene-styrene-vinylpyridine copolymer.
Figure 3:
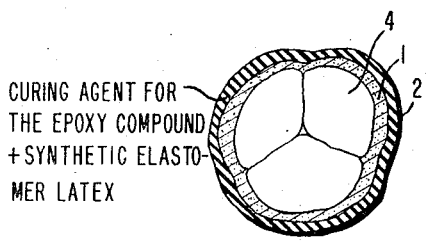
FIGURE 3 is a diagrammatic section of the coated fibrous material of FIGURE 2 to which has been applied a second layer 2 containing a curing agent and synthetic elastomer applied in latex form.
Figure 4:
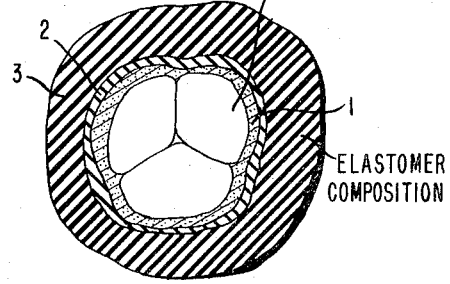

FIGURE 4 is the same as FIGURE 3 to which has been bonded an elastomer. This layer may be present in a large variety of forms such as a V-belt in which many filaments or yarns 4 are embedded in a relatively large mass of elastomer. The third elastomer layer may be applied to one or both sides of a fabric in which case 4 would be in the form of a fabric. Other embodiments illustrating diverse forms which element 4 may take will be apparent as the description of the invention proceeds.

Figure 5:
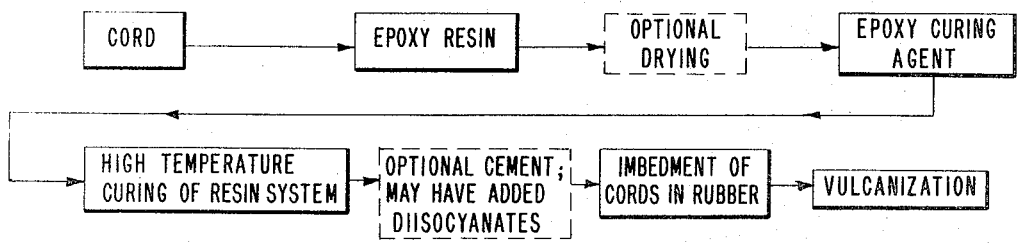

FIGURE 5 is a flow sheet showing the steps of the process and is self-explanatory. The rectangles in broken lines represent steps which are optional and may be omitted if desired.

In the examples showing the advantages of the adhesive system of this invention, three methods of determining the strength of the adhesive bond are used. One method, known as the strip adhesion test, is made on laboratory prepared specimens. The other two methods utilize complete V-belts produced by commercial methods except for the cord adhesive treatment. One of these, the dead weight test, exercises the belt around free running pulleys, one of which is weighted to maintain a standard tension. The other utilizes the belt to drive a dynamometer and transmit power at or above its rated capacity. Both are standard tests of the industry. The strip adhesion test determines the force necessary to strip cords embedded in the face of the rubber sheet from said sheet. In the two belt tests, the hours of running to cause cord separation or the loss in adhesion for a set number of hours running are determined.

In preparing samples for the strip adhesion test, lengths of treated cord are placed in the bottom of a steel mold, the cords being parallel with a spacing of 1 inch between cords. The cords being placed under dead weight tension to maintain their position. A sheet of unvulcanized compounded elastomer stock 125 mils in thickness is placed over the cords and the top plate of the mold placed over the rubber stock. The mold is put into a platen press. A pressure of approximately 150 p.s.i. is applied and the mold is usually heated to about 300° F. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and is found that the cords are firmly embedded in the cured elastomer stock, but are visible on the surface. This sheet is cut into 1-inch wide strips each having a cord in the center of its width. The cord end is separated from one end of the strip, the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord.

The cords used in the following examples are of the size and construction commonly used for V-belts. The polyester cord is made from a polymer of ethylene terephthalate available from E. I. du Pont de Nemours and Company under the trademark "Dacron." The 1100 denier yarn (Tex 122) is plied into a 3/3 cord having a denier of approximately 10,000 (Tex 1,110). The aliphatic nylon cord is a polyamide which is a polymer of hexamethyleneadipamide available from E. I. du Pont de Nemours and Company as Type 700 nylon. The 840 denier yarn (Tex 94) is plied into a 4/3 cord construction having a total denier of about 12,000 (Tex 1,330). The high tenacity viscose rayon cord is made by plying 1100 denier high tenacity rayon yarn into a 3/3 construction having a total denier of approximately 10,000 (Tex 1,100). The aromatic nylon cord is made from a polymer obtained by reacting metaphenylene diamine with terephthalic acid. This polymer is spun into an 1,100 denier yarn which is then plied into a 3/3 construction to form a cord having a total denier of about 10,000 (Tex 1,100).

EXAMPLE I

A two-layer adhesive system is prepared as follows. The first layer composition is prepared by adding 12.5 grams of an epoxy compound prepared by reacting epichlorohydrin with glycerol as disclosed for "Polyether A" in U.S. Patent No. 2,902,398, dated September 1, 1959, to a solution of 0.5 gram of sodium lauryl sulfate wetting agent (such as "Duponol" WA of E. I. du Pont de Nemours and Company) in 125 cubic centimeters of water and mechanically stirring for ten minutes to form a dispersion. Fifty grams of 41% solids latex of "Gen-Tac" (a copolymer comprising butadiene and vinylpyridine available from General Tire and Rubber Company) is then added with further stirring to complete the layer one composition.

A solution of 6.3 grams of meta-phenylene diamine curing agent in 188 cubic centimeters water is mixed with 195 grams of 41% "Gen-Tac" latex with stirring to complete the layer two composition.

The polyester cord described above is passed through the layer one solution and then passed through an air oven at 450° F. for 1.5 minutes and hot stretched 2.0%. After cooling, the so-treated cord is passed through the layer two solution and again into an air oven at 450° F. for 1.5 minutes while holding at constant length. The cords so-treated are then made into test specimens for the strip adhesion test as described above.

The elastomer composition used is a conventional V-belt stock having the following ingredients shown in parts by weight.

| | Parts by weight |
|---|---|
| SBR 1500 (synthetic rubber) | 85 |
| Smoked sheets, rubber | 15 |
| Zinc oxide | 3 |
| Neozone A | 1 |
| Philblack A (carbon black) | 25 |
| NT black (carbon black) | 60 |
| Paraflux | 5 |
| Circo light process oil | 10 |
| NBTS | 1 |
| Thermoflex A | 0.5 |
| DOTG | 0.3 |
| Stearic acid | 1 |
| Sulfur | 2 |

These ingredients are thoroughly mixed in a conventional manner and the composition formed on a calender into a sheet 125 mils thick. The treated polyester cords are combined with this rubber composition as described above and the product cut into strips and tested on the Instron tester. The force necessary to strip the cords from the cured rubber sheet is shown in Table I.

The aromatic nylon cord, the aliphatic nylon cord, and the viscose rayon cord described above are each treated with the two-layer adhesive system and dried under the same conditions used for the polyester cord. They are then made into specimens for the strip adhesion test and tested in the same manner. The force necessary to separate these cords from the rubber stock is measured on the Instron tester in the same way. The results of these tests are also shown in Table I.

For comparison, the same cords are treated with a one-layer adhesive system containing the same ingredients utilized in the two-layer system of this invention and prepared in the following manner. A dispersion of 12.5 grams of the epoxy compound, identified above, in 125 cc. of water with 0.5 gram "Duponol" WA is prepared as before. A solution of 6.3 grams of metaphenylene diamine curing agent in 188 cc. of water is added to 245 grams of 41% "Gen-Tac" latex. The dispersion of epoxy compound is added to the solution and the mixture of curing agent plus latex is mechanically stirred for 5 minutes. After dipping in this one-layer adhesive solution, the cords are dried in an air oven at 450° F. for 1.5 minutes. They are then made into test specimens and tested for strip adhesion as above. The results of such tests are also shown in Table I.

It is seen from Table I that the two-layer adhesive system of this invention provides a very strong bond to the elastomer composition such that a force of approximately 10 pounds is required to separate these cords from the elastomer composition. It is noted that there is essentially no separation at the interface between the cord and the elastomer compound. The failure is primarily within the elastomer composition and the cords removed are substantially covered with a layer of the elastomer compositon. On the other hand, the cords treated with the one-layer adhesive system containing the same ingredients provide a relatively poor adhesive bond to the elastomer composition of approximately 2 pounds. It is observed that with cords treated in this manner the separation is primarily between the cord and the elastomer compositon and the cords removed are substantially free from the elastomer composition.

TABLE I

| System | Strip Adhesion, Pounds | | | |
|---|---|---|---|---|
| | Polyester Cord | Aliphatic Nylon Cord | Aromatic Nylon Cord | Viscose Rayon Cord |
| Two-Layer | 9.65 | 10.0 | 10.0 | 10.5 |
| One-Layer | 1.75 | 2.27 | 1.95 | 2.30 |

EXAMPLE II

This example illustrates, for comparison, that the superior bond to polyester cord, achieved in accordance with applicant's invention in Example I, is not obtained by certain prior art procedures. The polyester fiber cord of Example I is treated with three preferred prior art adhesives, combined with the elastomer compound of Example I, and tested for strip adhesion. Cord treated with a resorcinol-formaldehyde-"Gen-Tac" dispersion made alkaline with NaOH having 7.3% solids pick-up has a strip adhesion value of 1.6 lbs. Cord treated with a neutral resorcinol-formaldehyde-"Gen-Tac" adhesive having 12% solids pick-up shows a strip adhesion value of 1.3 lbs. Cords treated with a diisocyanate adduct after the teaching of Belgian Patent No. 561,699 with 8% pick-up shows a strip adhesion value of 4.3 lbs.

EXAMPLE III

An 1100 denier (Tex 122) untwisted polyester yarn ("Dacron"—E. I. du Pont de Nemours and Company) is treated with the epoxy compound of Example I by passing the yarn over a wiping roll, the lower portion of said roll dipping into a tray containing the treating material, and winding the yarn on a bobbin. This singles yarn, which contains 3% of the epoxy compound based on the weight of fiber, is not tacky. The treated yarn is stored under ordinary room conditions for six weeks and is then twisted into an 1100 denier/3/3 cord. The cord has normal physical properties and the presence of the epoxy compound is barely detectable by touch. This cord is then treated with the layer two composition of Example I and dried under identical conditions. It is found to have a strip adhesion value of 7.5 lbs. in GRS rubber stock and 6.0 lbs. in Neoprene stocks.

EXAMPLE IV

The polyester cord of Example I is treated with the two-layer adhesive system of Example I except that the 6.3 grams of meta-phenylene diamine is replaced with a like amount of diethylene triamine in the second-layer composition. The application and drying procedures of both layer one and layer two are the same as in Example I and the elastomer composition is similar. The strip adhesion per cord is found to be 10.0 pounds and 9.7 pounds for two specimens.

For comparison, the polyester cord is treated with the single-layer adhesive system of Example I except that the 6.3 grams of meta-phenylene diamine is replaced with a like amount of diethylene triamine. The application methods and elastomer composition are the same as in the above paragraph. The strip adhesion value is found to be 1.44 pounds and 2.09 pounds for two specimens.

EXAMPLE V

The polyester cord is treated with the two-layer adhesive system of Example I except that the 12.5 grams of epoxy compound is replaced with a like amount of other epoxy compounds. In one case, the epoxy compound of Example I is replaced by an aliphatic low molecular weight diepoxide prepared as disclosed for "Polyether B" is U.S. Patent No. 2,902,398. In a second adhesive system, the epoxy compound of Example I is replaced with an aromatic diepoxide prepared by reacting epichlorohydrin with 2,2-bis(4-hydroxyphenyl)propane as disclosed for "Polyether C" in U.S. Patent No. 2,902,398. For comparison, corresponding substitutions for the epoxy compound in the single-layer adhesive system of Example I are made. The method of application of the one-layer and two-layer systems and the strip adhesion testing are the same as in Example I. The elastomer composition used is a typical commercial V-belt stock based on GRS synthetic rubber. The strip adhesion bond strengths determined for the adhesive systems are shown in Table II.

TABLE II

| Epoxy Compound | Strip Adhesion Value in Pounds | |
|---|---|---|
| | One-Layer Adhesive System | Two-Layer Adhesive System |
| Aliphatic diepoxide | 2.09 | 7.15 |
| Aromatic diepoxide | 3.36 | 6.23 |

EXAMPLE VI

The ability of the two-layer adhesive system of this invention to provide firm bonding with a variety of elastomers is shown in this example. Three typical commercial V-belt elastomer compounds are used, one of which is based primarily on GRS synthetic rubber, a second being based on natural rubber, and the third being based on "Neoprene" synthetic rubber. The same polyester cord of Example I is treated with the two-layer adhesive system of Example I with the sole exception that for treating the cord to be bonded to the natural rubber stock the latex rubber component of layer two is made up of "Gen-Tac" latex and "Pliolite" 2104 polybutadiene latex in equal parts of latex solids by weight.

For comparison, the cords to be bonded to the GRS elastomer composition and to the "Neoprene" composition are treated with the one-layer adhesive system of Example I, and the cord to be bonded to the natural rubber composition is treated by the single-layer adhesive of Example I except that the solids content of the latex component is made of "Gen-Tac" and "Pliolite" 2104 polybutadiene in equal parts by weight. The six samples of so-treated cords are then combined with the elastomer composition and tested for strip adhesion in the manner of Example I. The results of these tests are given in Table III.

TABLE III

| Elastomer Composition | Strip Adhesion Values in Pounds | |
|---|---|---|
| | One-Layer Adhesive System | Two-Layer Adhesive System |
| GRS | 2.2 | 9.2 |
| Natural Rubber | 2.0 | 10.2 |
| "Neoprene" | 1.0 | 8.5 |

EXAMPLE VII

This example illustrates that the superior bond to polyester cord achieved by applicant's invention is not obtained by applying the epoxy compound together with its curing agent in an aqueous medium, drying this first coat on the polyester, and then applying a cement of fusible aldehyde condensate and rubber in accordance with the teaching of U.S. Patent No. 2,902,398.

A treating solution is prepared as follows: 12.5 grams of the epoxy compound of Example I is added to 125 cc. of water containing 0.5 gram of "Duponol" WA and mixed with a high speed mixer for seven minutes. A solution of 6.3 grams of metaphenylene diamine in 188 cc. of water is prepared and this solution is added to the dispersion of epoxy compound in water with thorough mixing. The 10,000 denier polyester cord of Example I is passed through the above solution and then through an air oven, where it is exposed to air at 450° F. for 90 seconds while being stretched 2%. The treated cord is then passed through a conventional resorcinal-formaldehyde-latex adhesive solution in which the latex is the 41% solids "Gen-Tac" latex of Example I and the test cord is again passed through the 450° F. air oven.

The so-treated cord is then brought into contact with a typical V-belt rubber stock in which the primary elastomer is GRS synthetic rubber and cured by the method of Example I into specimens for the strip adhesion test. In this test the cord separates very easily from the cured elastomer compound requiring a force of only 0.78 lbs. There is a clean separation between the cord and the elastomer composition with no evidecene of tear in the elastomer.

EXAMPLE VIII

Polyester cords treated by the two-layer adhesive system as in Example I are made into standard size V-belts utilizing an elastomer composition based primarily on GRS synthetic rubber and tested on commercial equipment. In the dead weight testing, the belts are operated for periods up to 700 hours and sample belts are removed periodically for the determination of strip adhesion. In this procedure, a portion of the rubber is removed until the cords are exposed and alternate cords are then stripped from the remaining rubber. The percent loss in strip adhesion after intervals of running is determined. With the cords treated in accordance with the present invention, there is 19% loss in adhesion during the first 100 hours of running and substantially no further loss until the test is stopped after 700 hours of operation.

Similar belts made from the polyester cords treated by the method of Belgian Patent 561,699 show a 33% loss in adhesion during the first 100 hours of running and this loss continues until it reaches 52% after 700 hours.

Other specimens of these same V-belts are tested on a dynamometer with samples being removed at intervals for dissection and determination of remaining adhesion. With the belts treated for adhesion by the methods of the present invention, the loss in adhesion value is only 12% after 815 hours of operatioin. The belts having cords treated by the method of Belgian Patent 561,699 show a 48% adhesion loss after only 100 hours of operation.

EXAMPLE IX

Polyester cords treated as in Example I with the two-layer adhesion system of this invention are made into standard size V-belts utilizing an elastomer composition based primarily on "Neoprene". Polyester cords treated by the adhesive system of Belgian Patent 561,699 are also fabricated into V-belts in an identical way. Samples of both types of belt are tested by dead weight testing. The belt having cords processed by the methods of this invention actually show a gain in adhesive strength of 5% after 100 hours and a further gain to a total 19% increase in adhesion strength after 300 hours. The belts having cords treated by the adhesive method of Belgian Patent 561,699 show a loss of 11% in adhesion strength after 300 hours operation.

These same belts are tested on a dynamometer test in which it is intended to continue the test until the belts fail. The belt containing cords treated according to the present invention operate over 1000 hours with no sign of failure. The belts treated in accordance with the method of Belgian Patent 561,699 fail after periods averaging 400 hours.

The results shown in Examples VIII and IX demonstrate clearly that the adhesive system of the present invention when used in the manufacture of reinforced elastomeric articles which undergo high tensions and severe flexing in service leads to results which are distinctly superior to those achieved with known prior art adhesive methods.

The compositions of the two component parts of the adhesive system of this invention may be altered to a considerable extent to accommodate the materials to be bonded, the physical form of the fibrous structure and the methods of manufacture of the finished article. As mentioned earlier and shown in Example III, the first layer may be a liquid epoxy compound. These materials may be applied to a low twist yarn by using a wiper roll or pad such as are commonly used to apply textile finishes. For more dense structures, it is difficult to achieve uniform distribution by this means. The viscosity of the liquid epoxy compounds may be reduced by adding a diluent such as ethylene glycol, diethylene glycol, or low molecular weight monoepoxy compounds to improve this situation. Solutions of epoxy compounds in water, with the use of dispersing agents are more generally applicable. Such solutions are stable for long periods which is a convenience in many cases.

It is generally preferred to apply by such methods 1.5% to 5% of the epoxy compound based on the weight of fiber, and about 3% is preferred. Yarns or staple fibers containing this amount are not tacky but feel dry to the touch and process easily into other structures, and may be used as conventional yarns.

The presence of a latex in this first layer is usually desirable when the composition is to be applied to cords or fabrics, and a latex of a copolymer comprising butadiene and vinyl pyridine is preferred. In this case, a weight ratio of 3 parts of latex solids to 2 parts of epoxy compound is preferred although this ratio is not critical and may be varied without serious loss in adhesion. The total solids concentration in the composition applied as a first layer may be varied to suit the method of application to be used. It should be adjusted to apply 1.5% to 7% of total solids based on the fiber weight. The preferred range is 3% to 4%.

In the second layer, the amount of curing agent must be sufficient to cause conversion of the epoxy compound to a solid resin, at least in the interface between the two layers. The amount of latex solids should be from 5 to 12 times the weight of curing agent. The total solids content of the composition may vary depending on the method of application. For the treatment of cords by dipping, as in the above examples about 25% solids is optimum. The total solids pick-up should be 2% to 7% based on the fiber weight and 4% to 6% is preferred.

It has been found necessary to include in the latex solids of the second layer composition at least 25% of copolymers comprising butadient and a vinylpyridine such as "Gen-Tac," and frequently it is desirable to use only "Gen-Tac." For best adhesion to certain elastomer compounds, a mixture of elastomer latices is best. For example, in bonding to natural rubber compounds it is preferred to use a mixture of "Gen-Tac" latex and a polybutadiene latex such that these elastomer solids are present in about equal parts by weight.

The total solids pick-up on the fibrous material from layer one plus layer two should be between 3% and 12% based on the fiber weight. A total pick-up of 7% to 10% is preferred. With higher solids pick-up there is a loss in adhesion.

As already noted, it is not necesary to apply a drying or heating step after the application of layer one of the adhesive system. Drying causes no loss in adhesion nor does heating to temperatures of 300° F. to 450° F. or even higher provided the fiber or adhesive components are not degraded. It is feasible to heat the treated fibers to stretch or shrink them.

After applying layer two, however, it is necessary to heat the treated fibers to 300–500° F. Heating at 450° F. for 1.5 minutes gives good results.

It is common practice in the manufacture of many reinforced rubber articles to treat the reinforcing fibrous material with a cement, which is generally a solvent solution or dispersion of a vulcanizable elastomer compound. This creates a tacky surface and intimate contact which facilitates the building operation and often increases the final adhesion. It is also known to add to such cements di- or polyisocyanates to improve adhesion. It has been found that this practice is also applicable to fibrous materials treated by the methods of this invention. The overlaying with cements containing di- or polyisocyanates, just prior to applying the rubber stock is particularly useful in improving the strength and uniformity of bonding to certain rubber stocks. For example, it provides improved adhesion to certain "Neoprene" stocks.

In considering the values obtained in the strip adhesion test, it is noted that values above 7 lbs. usually correspond to tearing of the rubber stock with no interface failure and values below 2.5 usually correspond to interface failure. Values between 2.5 lbs. and 7 lbs. may correspond to either type or both may occur at intervals along the cord. The higher numerical values are often determined by the tearing strength of the elastomer rather than the bond strength. Comparative values between different adhesives and systems in a single elastomer compound are often more significant than absolute values.

It will be understood that the materials and methods of the examples are chosen to assist in describing the present invention and not to limit its scope except as stated in the claims. Many modifications will be suggested to those skilled in the art which are within the spirit of the invention. For instance, substituted epoxy compounds having additional reactive groups may be used, and may require mixed solvents or particular methods of preparing dispersions.

Catalysts for promoting cross-linking reactions between substituent functional groups or between such groups and the epoxy groups or between epoxy groups may be used. A wide variety of bi- and polyfunctional compounds are known to be useful as curing agents for epoxy compounds and combinations of catalysts and curing agents are possible. Such variations may require modifications in concentrations, methods of application and time and temperature conditions. It appears to be a necessary requirement of the invention that the epoxy compound applied directly to the fibrous material in the first layer remain substantially unreacted until after the application of the second layer and that the reactions converting the epoxy compound to an infusible heat-setting resin be initiated at the interface between the first layer and the second layer.

The advantage of the two-layer adhesive system of the present invention over the methods of the prior art is that when properly compounded and applied, an adhesive bond substantially as strong as the tear strength of the cured elastomer composition may be achieved with a wide variety of synthetic fibers and elastomers. This advantage will be particularly useful with combinations which have been difficult to bond as, for example, the combining of polyester or aromatic polyamide fibers with "Neoprene."

It is well known that alterations in the compounding ingredients of elastomer compositions affect the adhesive bond and compromises have been made in this regard to obtain a practical level of adhesion at the sacrifice of other valuable properties. In such cases, the use of the present invention permits greater freedom in compounding to achieve the optimum properties of the elastomer composition.

The ingredients used in the present invention are readily available and the complete compositions of the first two layers have adequate shelf life for commercial requirements of shipping and storing. No organic solvents are required and therefore no problems of solvent recovery or fire hazards are involved. The equipment required for application is widely available. Furthermore, fibrous materials treated with the first layer only may be stored for long periods before applying layer two, and the completely treated fibrous material may also be stored before combining with elastomer compositions without substantial loss in adhesive potential.

It will be apparent that many widely different embodiments of this invention may be made without departing from the spirit and scope thereof, and therefore it is not intended to be limited except as indicated in the appended claims.

I claim:

1. In the process of preparaing a rubber article reinforced with a structure composed of synthetic fibrous material, selected from the group consisting of polyester, nylon and viscose rayon yarn, which includes forming a bonding coat on the structure by treatment with an epoxy compound together with a curing agent for the epoxy compound, treatment with a latex of synthetic elastomer and drying the coating, forming an assembly of the coated structure with rubber and then vulcanizing the assembly; the improvement of applying to the synthetic fibrous material a first layer containing a low molecular weight epoxy compound free from curing agent, applying thereover a distinct second layer comprising a curing agent for the epoxy compound and a latex of synthetic elastomer composition containing at least 25% of copolymers of butadiene and a vinylpyridine, heating the coated structure at a temperature of 300° to 500 F. for a time sufficient to cause a curing reaction between the epoxy compound and the curing agent at the interface between the first and second layers, bringing the coated structure into contact with a vulcanizable elastomer composition, and thereafter curing the assembly with heat and pressure.

2. The process of claim 1 in which the fibrous material is composed of a linear glycol terephthalate polyester.

3. The process of claim 1 in which the first layer contains a butadiene vinylpyridine copolymer.

4. The process of claim 1 in which the fibrous material and first layer are heated above about 300° F.

5. The process of claim 1 in which the epoxy compound is present in the amount of from about 1.5% to 5% by weight based on the weight of the fiber.

6. The process of claim 1 in which the first layer contains about 3 parts of latex solids to 2 parts of epoxy compound.

7. The process of claim 1 in which the weight of solids applied in the first layer is from about 1.5% to 7% of the weight of the fibrous material.

8. The process of claim 1 in which the latex solids in the second layer is from 5 to 12 times the weight of the curing agent.

9. The process of claim 1 in which an adhesive cement is applied to the coated structure before the elastomer composition is contacted therewith.

10. The process of claim 9 in which the adhesive cement contains an isocyanate.

11. The process of claim 1 in which the epoxy compound is a reaction product of epichlorohydrin with glycerol.

12. A rubber article reinforced with a structure composed of synthetic linear polyester fibrous material and prepared as defined in claim 1.

References Cited by the Examiner

UNITED STATES PATENTS

| | | | |
|---|---|---|---|
| 3,190,764 | 6/1965 | Cardina | 117—62.2 |
| 3,222,238 | 12/1965 | Krysiak | 156—330 |
| 3,247,043 | 4/1966 | Cardina | 156—314 |

FOREIGN PATENTS

| | | |
|---|---|---|
| 788,381 | 1/1958 | Great Britain. |

OTHER REFERENCES

"Handbook of Adhesives" by Skeist; Reinhold Pub. Corp., 1962, p. 502.

EARL M. BERGERT, *Primary Examiner.*

R. A. FLORES, *Assistant Examiner.*